Dec. 18, 1934.　　　O. JANZEN　　　1,984,929

SYNCHRONOUS MOTOR

Filed Sept. 25, 1933

O. Janzen
INVENTOR

By Marks & Clerk
Attys.

Patented Dec. 18, 1934

1,984,929

UNITED STATES PATENT OFFICE 1,984,929

SYNCHRONOUS MOTOR

Otto Janzen, Berlin, Germany

Application September 25, 1933, Serial No. 690,885
In Germany September 29, 1932

4 Claims. (Cl. 172—275)

My invention relates to synchronous motors, and it is an object of my invention to provide a motor of this type which is particularly suitable for the operation of talking machines.

Synchronous motors are old in which a single exciting coil of annular form is arranged intermediate the stator and the rotor so as to excite both parts at the same time. With the object of my invention in mind, I subdivide this exciting coil into two spaced-apart coils which are connected in opposition, and insert a member of magnetic material between the inner faces of the two coils.

The old single-coil motors are quite satisfactory for the playing of sound records but, if used for the making of sound records, they possess certain drawbacks which are eliminated by the double-coil motor according to my invention, as will be explained below.

In the accompanying drawing, a motor embodying my invention is illustrated by way of example.

In the drawing

Figure 1:
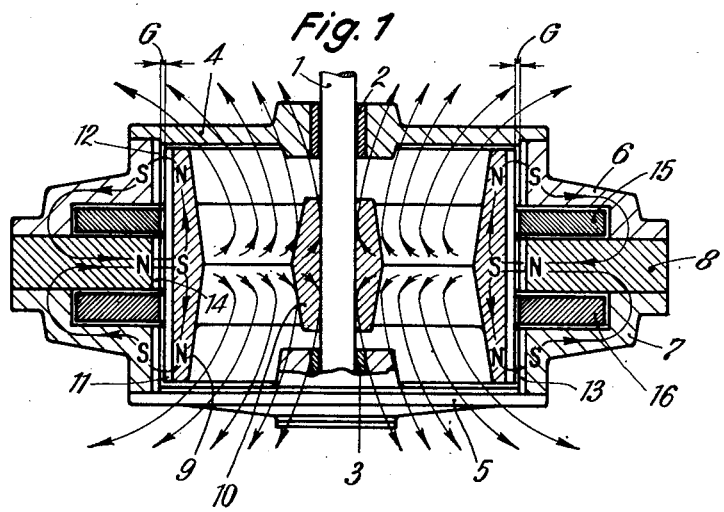
Fig. 1 is an axial section of the motor.

Referring now to the drawing, and first to Fig. 1, the rotor shaft 1 is mounted in suitable bearings 2 and 3 of the end plates 4 and 5. The two end plates 4 and 5, two flanged members 6 and 7, and an annular member 8 which is sandwiched between the inner faces of the flanged members 6 and 7, make up the stator. The rotor 9 is mounted on the shaft 1 with its boss 10. It is preferably made in one piece and is equipped with the usual rotor teeth 11 at the perimeter, corresponding stator teeth 12, 13 and 14 being formed on the flanged members and the annular member.

Figure 2:
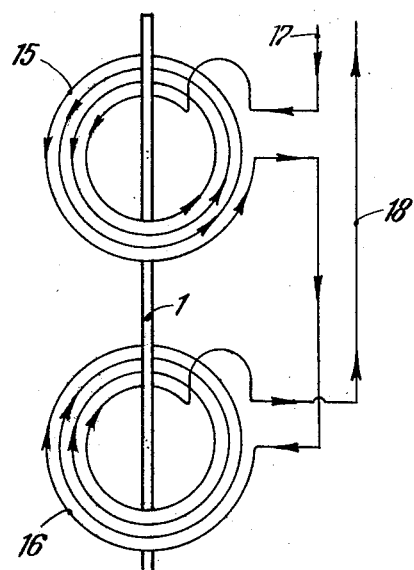
Fig. 2 is a diagram showing the connection of its coils in opposition.

Two annular exciting coils 15 and 16 are mounted in recesses of the flanged members 6 and 7 at opposite sides of the annular member 8. The two coils 15 and 16 are connected in opposition, as shown in Fig. 2 where 17 is a supply conductor, and 18 a return conductor. The current flows anti-clockwise in coil 15, and clockwise in coil 16.

The number of the teeth 11 on the rotor 9 is equal to that of the teeth 12, 13 and 14 on the stator members 6, 7 and 8. The sandwiched member 8 is of magnetic material which preferably is the same as the material of the stator, normally cast iron.

The stator which has been illustrated, with the two flanged members 6 and 7, and the sandwiched member 8, and in which the rotor 9 extends all over the poles or teeth of the stator, while the coils 15 and 16 are housed in recesesses of the flanged members; is a preferred embodiment. Other designs of stators may be provided without departing from my invention.

Figure 3:
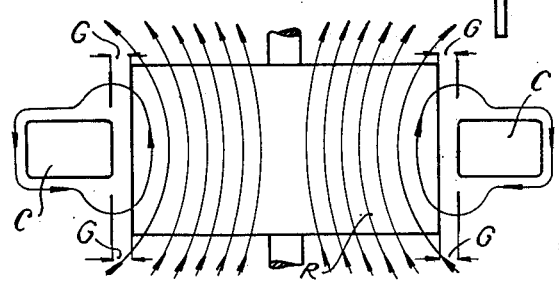
Fig. 3 is a diagram of the force lines in the old single-coil motor.

In the old or single-coil type of motor referred to, the force lines extend as shown in Fig. 3, that is, they enclose the single coil C and penetrate the stator and the rotor uniformly and substantially homogeneously in planes which are radial to the axis of the rotor R.

Motors of this general type are particularly suitable for the operation of talking machines because it is easy to design them as multi-polar and consequently slow-speed motors. The poles or teeth are arranged in two concentric rows on the stator and the rotor and the force lines cross the air gap G twice, and in opposite directions.

For the playing of sound records, such motors, as mentioned, are quite satisfactory as the power demand is small, the motor does not heat up excessively and its leakage field is so weak, particularly if the stator is of cast iron, that it will not interfere even with the most sensitive electric pick-up on the talking machine.

For making sound records, however, the power demand is higher than for playing and the excitation of the coil C must be increased if the size of the motor is not to become very large. The increased excitation of the coil C increases the magnetic saturation of the path of the force lines, and also the leakage. This is particularly troublesome at the upper side of the motor where the leakage lines penetrate into the iron record bearer. The trouble does not show to any appreciable extent when the record is made but when the record is played, heavy humming at the system frequently will occur. It has been attempted to place screening plates below the record bearer but the trouble is not eliminated altogether, and there is the extra cost of the screening plates.

Another drawback of the old single-coil motors is that they behave like transformers electromagnetically. The exciting coil corresponds to the primary winding of the transformer, and the annular closed masses of iron in the stator and the rotor correspond to short-circuited secondary windings. Although the eddy, or rather secondary, currents in the iron parts are much reduced because the stator and the rotor are of cast iron which reduces the specific resistance of the iron parts, the eddy or secondary currents still were so strong as to cause an appreciable heating of the motor and to limit its power output.

Another drawback is that the eddy or secondary currents in the stator and the rotor produces a strong magnetic field which interferes with the pick-up like the proper field of the coil C. Moreover, the field of the eddy or secondary currents is distorted in phase with respect to the proper field of the coil, and so the resulting field from both never becomes zero and it is not easy for the pole teeth of the motor to overstep the border between the range of one stator tooth and the next one.

By subdividing the exciting coil of the old motor in the manner described, I obtain a motor which is superior to the single-coil motor in that its excitation and output are increased without unduly increasing the leakage and the heating and the motor develops more power without being made larger.

According to my invention, as described, I provide two individual coils instead of a single coil. The two coils 15 and 16 are connected in opposition (Fig. 2) and are arranged one above the other, with the annular member 8, of magnetic material, preferably cast iron, sandwiched between them and equipped with pole teeth 14.

The polarities of the stator and the rotor are indicated by the letters "N" and "S" in Fig. 1. Each coil 15 and 16 is surrounded by a magnetic field whose force lines extend in planes radial to the axis of the rotor and enclose the corresponding coil. As the coils are connected in opposition the direction of the fields in the sandwiched member 8 is the same, as shown by the arrows in Fig. 1. The rotor 9 which, as mentioned, is preferably made in one piece, extends all over the three rows of poles or teeth 12, 13 and 14 in the stator, and the force lines cross the gap G at three points, and not at two, as in the old motor, Fig. 3.

Comparing the diagram in Fig. 3 with the section in Fig. 1, it will be found that for equal field intensity and power the fields above and below the coils 15 and 16 are only one-half of the field in the old motor, Fig. 3, while in the space between the two coils 15 and 16 the two equi-directional half fields combine into a resultant field which is equal to the field in the old motor. The watt consumption is only about one-half of that in the old motor.

This distribution of the fields has for its consequence that the saturation above and below the coils 15 and 16 is only one-half of that in the old motor and so there will be no troublesome leakage even if the excitation is increased. The field has no tendency to penetrate into the record bearer and the pick-up, as it does in the old motor.

As the coils 15 and 16 are connected in opposition, the currents induced by their proper fields are oppositely directed and therefore the eddy or secondary currents in the iron of the stator and the rotor do not become effective. The suppression of the said currents and their fields eliminates not only the heating they produce, and the limit set to the power of the motor by such heating, but also the phase distortion with the proper fields of the coils 15, 16, so that the proper fields act freely on the rotor teeth 11.

I claim:

1. In a synchronous electric motor in combination a stator, a rotor, an exciting coil which is subdivided into two single coils connected in opposition, arranged axially one above the other and coaxially to the motor axis, an alternating current source which excites the two single coils simultaneously with the same frequency, a magnetizable annular member between the two single coils in which member the force lines of the two single coils are added while the secondary currents in stator and rotor are suppressed.

2. In a synchronous electric motor according to claim 1, wherein the stator, the rotor and the magnetizable annular member are made of cast iron.

3. In a synchronous electric motor according to claim 1, the stator is made of cast iron and provided with teeth, the rotor being made of cast iron and provided with teeth and the magnetizable annular member being made of cast iron and provided with the same number of teeth as the stator and the rotor.

4. In a synchronous electric motor according to claim 1, wherein the stator comprises an upper pole ring surrounding the upper part of the exciting winding and a lower pole ring surrounding the lower part of the exciting winding the magnetizable annular member being arranged between the two pole rings and the two single coils of the exciting winding, pole teeth on all three stator annular members, the rotor being provided with the same number of teeth, said rotor being made in one piece to bridge all three stator annular members in an axial direction.

OTTO JANZEN.